Sept. 4, 1934.  L. F. NENNINGER  1,972,828
MILLING MACHINE
Filed Oct. 26, 1931
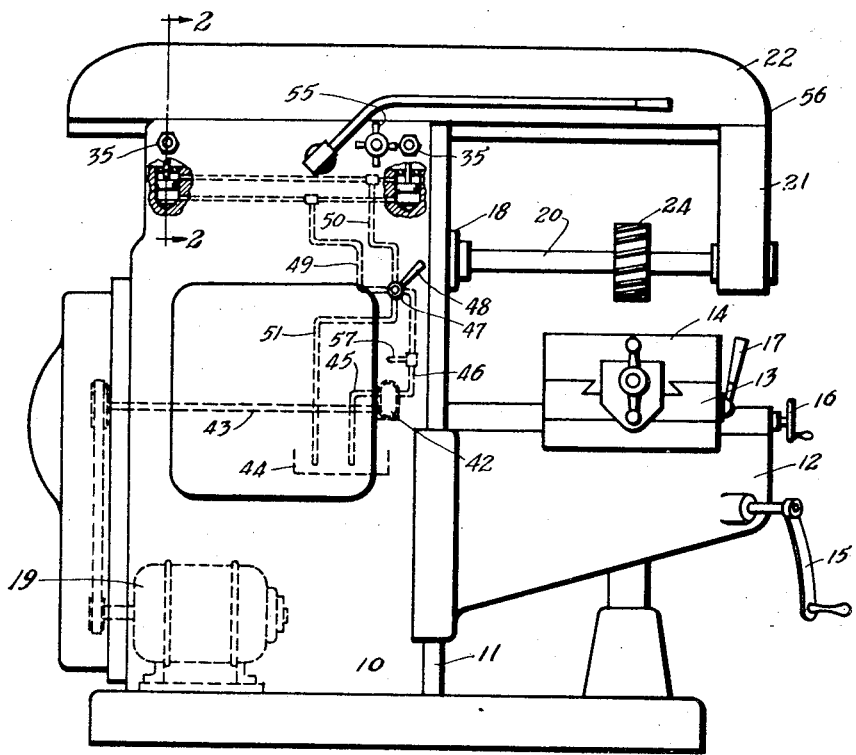
Fig. 1
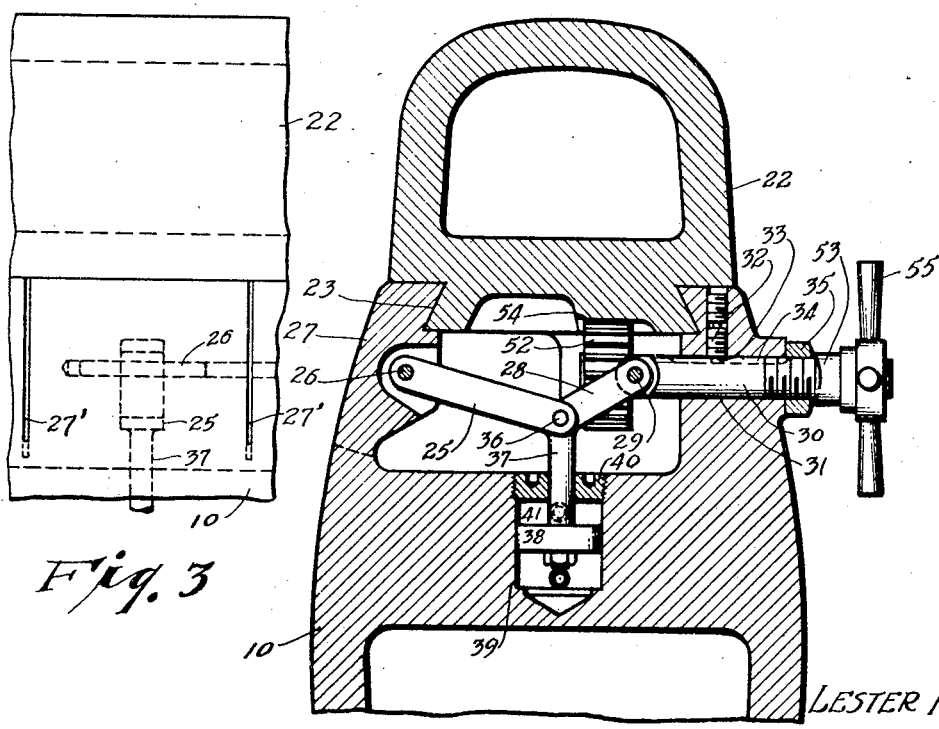
Fig. 3
Fig. 2
Inventor
LESTER F. NENNINGER
By
A. H. Parsons
Attorney Patented Sept. 4, 1934

1,972,828

UNITED STATES PATENT OFFICE 1,972,828

MILLING MACHINE

Lester F. Nenninger, Cincinnati, Ohio, assignor to The Cincinnati Milling Machine Company, Cincinnati, Ohio, a corporation of Ohio Application October 26, 1931, Serial No. 571,071

12 Claims. (Cl. 90—18)

This invention relates to milling machines and more particularly to improved means for clamping the overarms thereof.

One of the principal objects of this invention is the provision of an improved power actuated clamping mechanism for machine tool slides in which the effectvie clamping pressure may be varied although the motivating force remains the same.

Another object of this invention is the provision of an improved hydraulically actuated clamping mechanism which is especially applicable to machines having a source of hydraulic pressure for actuation of other auxiliary devices whereby all the auxiliary hydraulically actuated devices on the machine may be supplied from a common source.

A further object of this invention is the provision of an improved power actuated clamping mechanism for an adjustable member of a milling machine, whereby a saving of time may be effected in set up or adjustment of the machine thus increasing its actual productive time.

An additional object of this invention is the provision of a new and improved clamping mechanism for the overarm of a milling machine which may be easily and quickly operated from various positions at the machine to the end that the operator will utilize the clamping mechanism to a greater degree thereby insuring greater accuracy in the work produced by the machine.

Other objects and advantages of the present invention should be readily apparent by reference to the following specification considered in conjunction with the accompanying drawing illustrative of one embodiment thereof but it will be understood that any modifications may be made in the specific structural details thereof within the scope of the accompanying claims without departing from or exceeding the spirit of the invention.

Referring to the drawing in which like reference numerals indicate like parts:

Figure 1 is a front elevation of a milling machine embodying the principles of this invention.

Figure 2 is a vertical section on line 2—2 of Figure 1.

Figure 3 is a detail view showing the flexible clamping portion on the column.

In the drawing the reference numeral 10 indicates the column of milling machine having guideways 11 formed on the front face thereof upon which a knee 12 is movable for vertical adjustment. The knee carries a saddle 13 which is movable thereon toward and from the column and the saddle in turn carries a table 14 which is reciprocable transversely of the saddle movement. These various elements constitute an adjustable work support organization, the lever 15 serving to actuate mechanism for elevating the knee; a hand wheel 16 for actuating the saddle and the lever 17 determining the direction of movement of the table.

A cutter spindle 18 is journaled in the upper part of the column for actuation through an hydraulically shifted variable speed transmission, more particularly shown in co-pending application Serial Number 395,929 filed September 28, 1929, by a prime mover 19 located in the base of column 10. A cutter arbor 20 is fixed at one end in the spindle and journaled at the other end in the arbor support 21 adjustably secured to the end of the overarm 22 which is adjustably mounted in guideways 23 formed on the top of the column. The arbor 20 carries a cutter 24 for rotation by the spindle to effect metal removal from work mounted on the work support organization.

The parts just described constitute the usual elements of a knee and column type milling machine which type is shown for illustrative purposes, it being understood that any type in which the work support organization is relatively movable with respect to the cutter supporting member may have been selected to illustrate this invention.

In the setup and adjustment of a milling machine and particularly in effecting changes in the cutters thereof it is often necessary to move the overarm to facilitate these operations. Means are usually provided on these types of machines to clamp the overarm in position after adjustment which usually comprises some sort of nut member which must be tightened by a wrench or other tool to insure that the overarm is aligned parallel with the cutter spindle so that the cutter arbor supported thereby will be held in true axial alignment with the axis of the spindle. Since this usually can only be effected from a position at the rear of the machine operators working on small lots or single pieces neglect to clamp the overarm with the result that the cutter supporting structure is not as steady or rigid as it might be with the result that inaccuracies in the work may occur. It is therefore desirable that a clamping mechanism be provided for the overarm of a milling machine which is quick in operation and which requires little or no time on the part of the operator to actuate thereby inducing the operator to use it at all times resulting in more accurate work.

The clamping mechanism of this invention has been produced to accomplish the foregoing results and comprises a toggle mechanism including a link 25, one end of which is pivotally connected at 26 to a flexible portion 27 of the column shown in Figure 3 which has a pair of parallel kerfs or sawcuts 27' formed at opposite ends of the pivot 26. A second link 28 is pivotally connected at one end 29 to an adjustment bolt 30 which is slidably mounted in a bore 31 formed in the opposite wall of the column. A set screw 32 is threaded in the column having a reduced end 33 engaging a longitudinal spline 34 formed in the bolt to prevent rotation thereof. The end of the bolt is threaded to receive an adjusting nut 35 which determines the effective clamping pressure of the mechanism.

The links 25 and 28 are pivotally connected at 36 to the end of a piston rod 37 which has a piston 38 secured to the end thereof and slidably mounted in a cylinder 39 formed in the column casting. A piston rod extends through a stuffing box 40 which closes the upper end of the cylinder.

It should now be apparent that if fluid pressure is admitted to the upper end 41 of the cylinder that a force will be exerted through the links 25 and 28 tending to draw the pivot points 26 and 29 toward one another which will cause the flexible portion 27 to bind or clamp the overarm in its guideways and against the solid wall 33.

Since the effective clamping pressure will vary in some degree according to the angle of inclination of the toggle arms the nut 35 has been provided for varying this angle and thereby varying the clamping pressure. It will be noted that this is accomplished without changing the area of the piston 38 or the pressure in the chamber 41 of the cylinder. It is thus possible to change the effective clamping pressure without changing the magnitude of the motivating force which power operates the clamp.

Fluid pressure is supplied to the clamping mechanism from a pump 42 located in the column and adapted to be actuated from prime mover 19 through a branch transmission line 43. This pump may also be utilized for supplying fluid pressure to other auxiliary devices through branch line 57 such as the hydraulic gear shift mechanism of the variable speed transmission for the spindle and for lubricating purposes, all as more particularly shown in the previously mentioned co-pending application. A reservoir 44 is located beneath the pump into which the intake pipe 45 extends. An outlet or discharge pipe extends from the pump to a control valve 47 mounted on the side of the column adjacent the guideway 11 from which position the handle 48 of the valve may be accessible from the operator's position at the front of the machine as well as from the rear of the table. A channel 49 extends from the control valve to the lower end of the cylinders 39 and a second channel 50 extends from this valve to the upper end of the cylinder. A return line 51 serves to return fluid from the cylinders to the reservoir. The valve has two positions, in one of which the channel 49 is connected with the pressure line 46 to effect unclamping of the overarm, at which time the channel 50 and the upper end of the cylinder is connected through the return line 51 to reservoir permitting return of excess fluid in the upper end of the cylinders. In the other position of the valve the upper end of the cylinders are connected to the pressure line 46 to effect clamping of the overarm and the lower end of the cylinders are then connected to reservoir.

When the overarm is unclamped it may be moved longitudinally by means of a pinion 52 secured to the end of a stud shaft 53, journaled in the side wall of the column, the pinion engaging rack teeth 54 formed on the under side of the overarm. A hand wheel 55 is secured to the outer end of the shaft 53 for effecting rotation of the pinion and thereby longitudinal adjustment of the overarm. Attention is invited to the fact that the hand wheel is located near the front of the column where it is accessible from the operator's normal position at the front of the machine or from a position at the side of the machine.

Since it is possible to reach the valve control lever 48 from both the front and side of the machine as well as the lever 55 it will be apparent that the overarm may be adjusted and clamped from either operating position at the machine.

The rotation of the valve being a very simple operation it will be apparent there will be an increased tendency for the operator to clamp the overarm after arbor or cutter adjustments, than would be the case where it was necessary as in prior structures to tighten a plurality of clamping bolts thereby insuring greater accuracy in the position of the cutter relative to the work support.

An improved power actuated clamping mechanism for adjustable members of machine tools such as the overarm of a milling machine has thus been provided which is susceptible of application to any machine tool having a source of constant hydraulic pressure whereby this mechanism as well as the other hydraulic actuated devices on the machine may be supplied and actuated from a single source of pressure, and if the source of pressure is constant as when supplied by an accumulator, or a pump and relief valve, the mechanism is so contrived that its effective clamping pressure may still be varied. In addition an improved means has been provided for easily and quickly clamping the overarm of a milling machine from a plurality of operating stations at the machine inducing greater utilization thereof resulting in increased accuracy in the product of the machine.

That which is claimed is:

1. In a device of the class described having a support and guideways formed in the top thereof, the combination of an overarm slidably mounted in said guideways, means to clamp the overarm relative to the support including a pair of connected toggle arms, the end of one arm being pivotally connected to one side wall of the guideway, the other arm having means projecting through the other wall to the exterior of the support and operatively connected therewith, hydraulically actuated means for operating said arms and means on the outside of the support and connected to said projecting means to vary the angular relation of said toggle arms and thereby determine the clamping pressure on the overarm.

2. A milling machine having a column, guideways formed on the top of the opposing side walls of the column, a toggle arm pivotally connected to one side wall adjacent the bottom of the guideway formed therein, a bolt slidably mounted in a bore formed in the opposite wall of the column adjacent the bottom of the guideway formed therein, said bolt having a nut threaded upon the exterior end thereof, a second toggle arm pivotally connected to the inner end of said bolt, operating means pivotally connected to the free ends of said toggle arms to effect clamping of the overarm and means to adjust said nut to vary the angular relation of the arms and thereby vary the clamping pressure thereon.

3. A milling machine having a column including spaced side walls, overarm guideways formed in the top of said walls, an overarm reciprocably mounted therein, toggle arms connected to said side walls, means to actuate said arms to exert an inward pull on said walls to clamp the overarm to the column including a piston and cylinder, said cylinder being formed in the column, a piston rod coupling the piston to the ends of said arms, a pump mounted in the column, means to continuously actuate the pump during the operation of the machine, a control valve, channel means connecting the pump to said valve, and additional channel means connecting the valve to the opposite ends of the cylinder for alternate subjection thereof to pressure to effect clamping and unclamping of the overarm.

4. A milling machine having a column, a spindle journaled therein, a prime mover mounted in the column and adapted to rotate the spindle, guideways formed in the top of the column parallel to the axis of the spindle, an overarm mounted in said guideways, a cutter arbor fixed for rotation by the spindle, means on the overarm to support the outboard end of said arbor coaxial with the spindle axis, hydraulically actuated means for clamping the overarm to the column, a pump, means to actuate the pump by the prime mover, said pump having an inlet and an outlet, means coupled to said outlet for supplying fluid pressure to the hydraulic clamping mechanism, a branch lubricant supply line coupled with said outlet, and valve means for controlling the flow to the clamping mechanism.

5. A milling machine having a spindle support, a cutter spindle journaled therein, a cutter arbor mounted in the spindle for rotation thereby, means to support the outboard end of said arbor coaxially with the spindle including spaced parallel overarm guideways formed on the top of the spindle support parallel to the axis of the spindle, an overarm adjustably mounted in said guideways, one of said guideways having flexible portions, means to move said portions toward the opposite fixed guideway to clamp the overarm to the spindle support including links pivotally connected to each flexible portion, corresponding arms pivotally connecting each link to the fixed portion and power actuated devices connected to the juncture of each link and arm for exerting a force at right angles to the plane of said guideways to effect clamping or unclamping of the overarm.

6. A milling machine having a spindle support, a cutter spindle journaled therein, a cutter arbor mounted in the spindle for rotation thereby, means to support the outboard end of said arbor coaxially with the spindle including spaced parallel overarm guideways formed on the top of the spindle support parallel to the axis of the spindle, an overarm adjustably mounted in said guideways, one of said guideways having flexible portions, means to move said portions toward the opposite fixed guideway to clamp the overarm to the spindle support including links pivotally connected to each flexible portion, corresponding arms pivotally connecting each link to the fixed portion, power actuated devices connected to the juncture of each link and arm for exerting a force at right angles to the plane of said guideways to effect clamping or unclamping of the overarm, and means to vary the angular relation of said arms relative to the fixed guideway to change thereby the clamping pressure on the overarm.

7. A milling machine having a support member, a spindle journaled in said member, a work support organization adjustable relative to the spindle including a table movable transversely of the spindle and in a plane parallel to its axis, a cutter arbor fixed at one end in the spindle for rotation thereby, means to support the other end of the arbor in axial alignment with the spindle including an overarm, guideways formed in the support member parallel to the spindle axis for receiving said overarm, fluid operable means for compressing the guideways against the side of the overarm to clamp the same to the column, said means including a plurality of transversely extending linkages spaced longitudinally of the overarm, an operating cylinder for each linkage, and means to jointly control the energization of said cylinders.

8. A milling machine having a rotatable cutter spindle, a support for said spindle, a cutter arbor extending beyond said support and having one end attached to the spindle for rotation thereby, said support having guide surfaces extending parallel to the axis of the spindle, overarm means having cooperating surfaces engaging said guide surfaces, arbor support means carried by the overarm means for effecting relative adjustment between the overarm means and the spindle support for positioning the arbor support for engagement with the arbor, means for causing relative lateral movement between said surfaces into clamping engagement with one another including inter-engaging relatively movable threaded members, said members being relatively movable for varying the degree of clamping, a power actuable part operatively connected to one of said threaded members for effecting axial movement thereof in a direction to effect said clamping engagement, and a manually operable control member for determining power actuation of said part, said member having a first position corresponding to a clamped condition of the overarm means, and a second position corresponding to an unclamped condition of said overarm means.

9. A milling machine having a rotatable cutter spindle, a support for said spindle, a cutter arbor extending beyond said support having one end attached to the spindle for rotation thereby, said support having guide surfaces extending parallel to the axis of the spindle, overarm means having cooperating surfaces engaging said guide surfaces, arbor support means carried by the overarm means, mechanism for effecting relative adjustment between the overarm means and the spindle support including a manually operable control lever, means for causing relative lateral movement between said surfaces into clamping engagement with one another including a plurality of axially reciprocable members movable transversely to said surfaces, means threaded on said members for determining the degree of clamping, power actuable means operatively connected for effecting joint movement thereof in a direction to effect said clamping engagement, and a manually operable control lever for determining operation of said power actuable means and having a first position corresponding to a clamped condition of the overarm means and a second position corresponding to an unclamped condition of the overarm means, said control member being closely associated with the first manually operable control lever whereby all adjustment and clamping may be controlled from a single station.

10. A milling machine having a rotatable cutter spindle, a support for said spindle, a cutter arbor having one end attached to the spindle for rotation thereby, said support having guide surfaces thereon extending parallel to the axis of the spindle, overarm means having cooperating surfaces engaging said guide surfaces and carrying means for supporting the outboard end of said arbor, means for causing relative bodily movement between said surfaces into clamping engagement with one another including a threaded member having a nut thereon for determining the degree of clamping, means for effecting bodily axial movement of the threaded member including a pivoted arm, means operatively connecting the arm to said member, a power actuable part for effecting oscillation of said arm, a source of power, and means to control the coupling of power to said part including a manually operable control lever having a first position corresponding to a clamped condition of the overarm means with the spindle support and a second position corresponding to an unclamped condition of the overarm means.

11. A milling machine having a rotatable cutter spindle, a support for said spindle, a cutter arbor having one end attached to the spindle for rotation thereby, said support having guide surfaces thereon extending parallel to the axis of the spindle, over-arm means having cooperating surfaces engaging said guide surfaces and carrying means for supporting the outboard end of said arbor, means for causing relative bodily movement between said surfaces into clamping engagement with one another including a threaded member having a nut thereon for determining the degree of clamping, means for effecting bodily axial movement of the threaded member including a pivoted arm, means operatively connecting the arm to said member, a power actuable part for effecting oscillation of said arm, a source of power, means to control the coupling of power to said part including a manually operable control lever having a first position corresponding to a clamped condition of the overarm means with the spindle support and a second position corresponding to an unclamped condition of the overarm means, and means for effecting longitudinal adjustment of the overarm means while unclamped including a second manually operable control lever closely associated with the first control lever whereby all adjustment and clamping of the parts may be controlled from a single station.

12. In a milling machine the combination of a column, a spindle journaled in the column, a prime mover mounted in the column and adapted to rotate the spindle, guideways formed on the column parallel to the axis of the spindle, an overarm mounted in said guideways, a cutter arbor fixed for rotation by the spindle, means on the overarm to support the outboard end of said arbor coaxially with the spindle, fluid operable means for clamping the overarm to the column, a conduit for delivering fluid for other fluid utilizing purposes, a common source of pressure for supplying fluid to said conduit and to said fluid operable means including a pump mounted in the column, means to drive the pump from the prime mover, fluid connections from the pump to the conduit, and additional fluid connections from the pump to said fluid operable means, said last named connections including a control valve for reversely actuating said clamping means.

LESTER F. NENNINGER.